Feb. 20, 1934. W. L. McNAMARA 1,947,610
TRANSFERRING DEVICE
Filed June 4, 1930 4 Sheets-Sheet 1
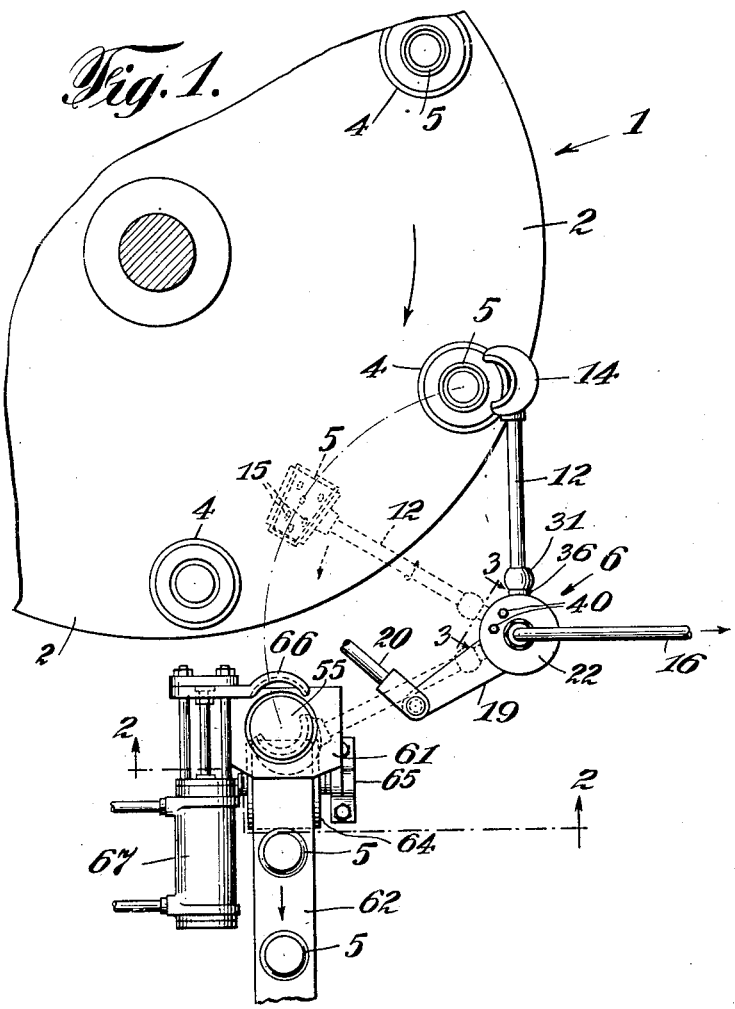
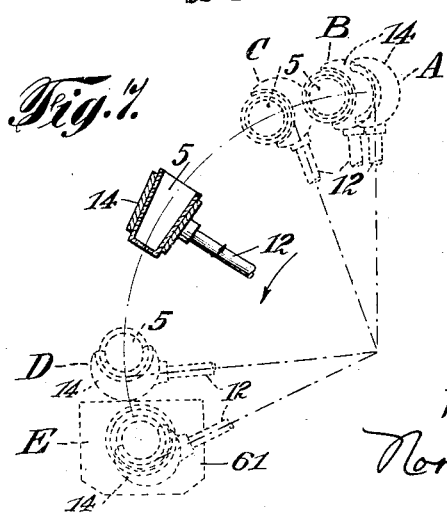
INVENTOR
William L. McNamara
BY
Norman N. Holland
ATTORNEY

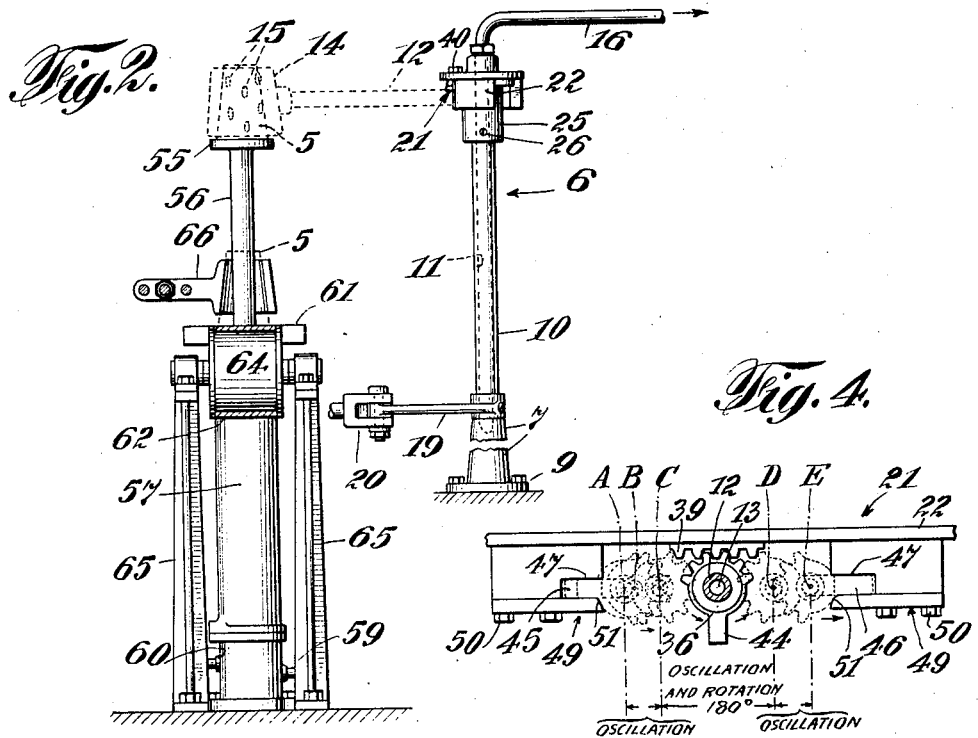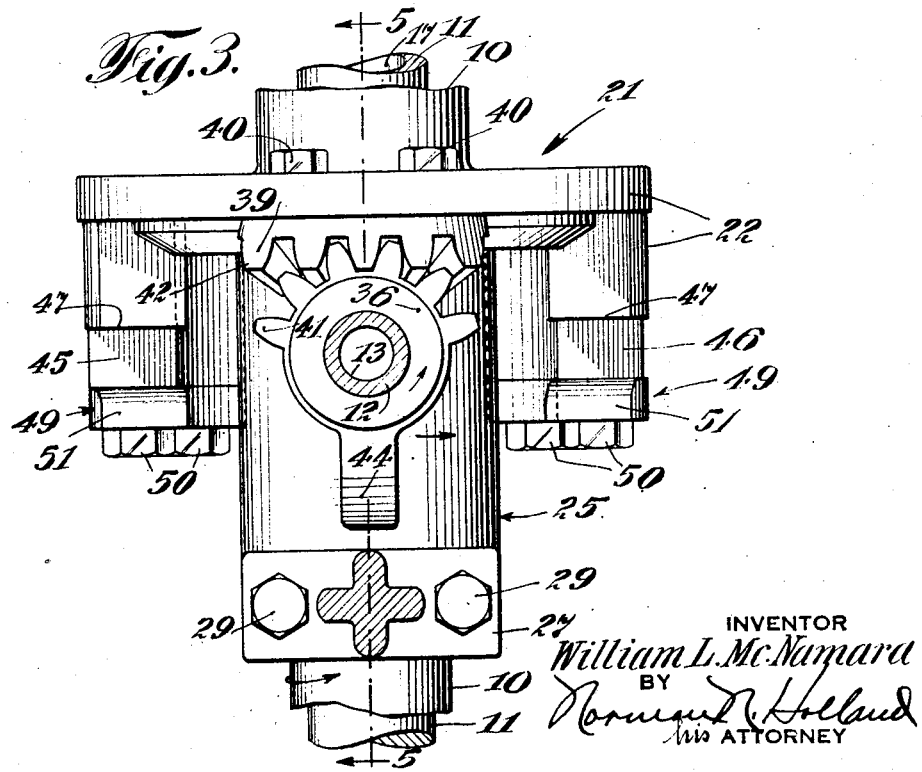

Feb. 20, 1934.                    W. L. McNAMARA                    1,947,610
                                   TRANSFERRING DEVICE
                                   Filed June 4, 1930           4 Sheets-Sheet 3
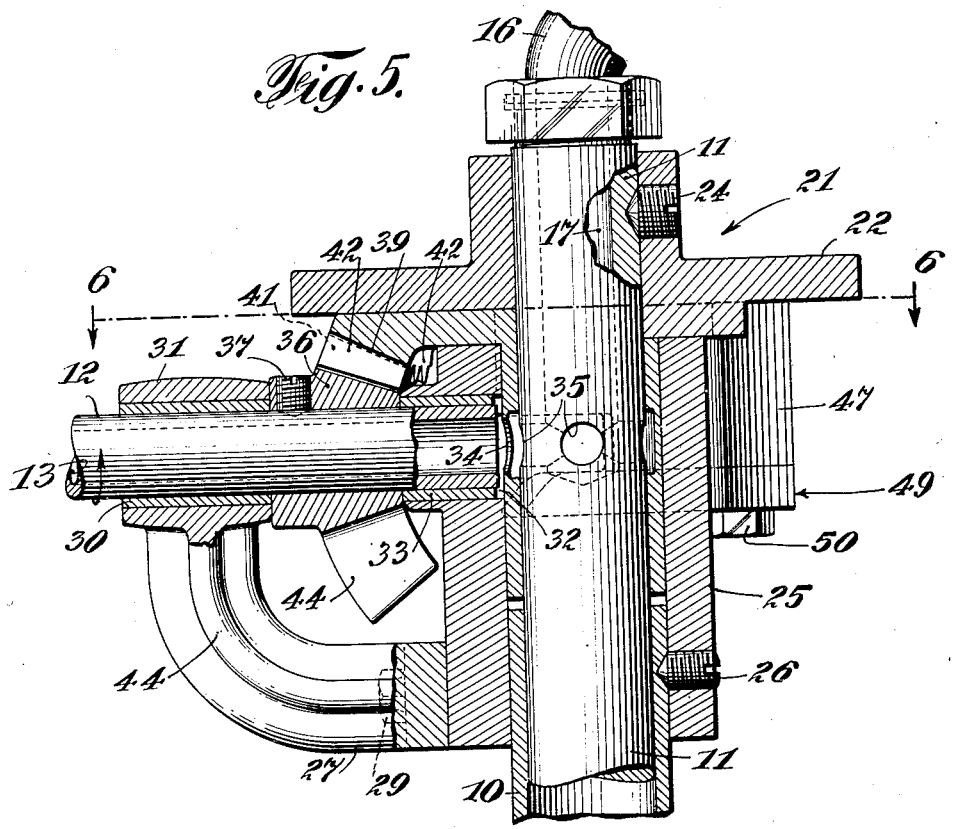
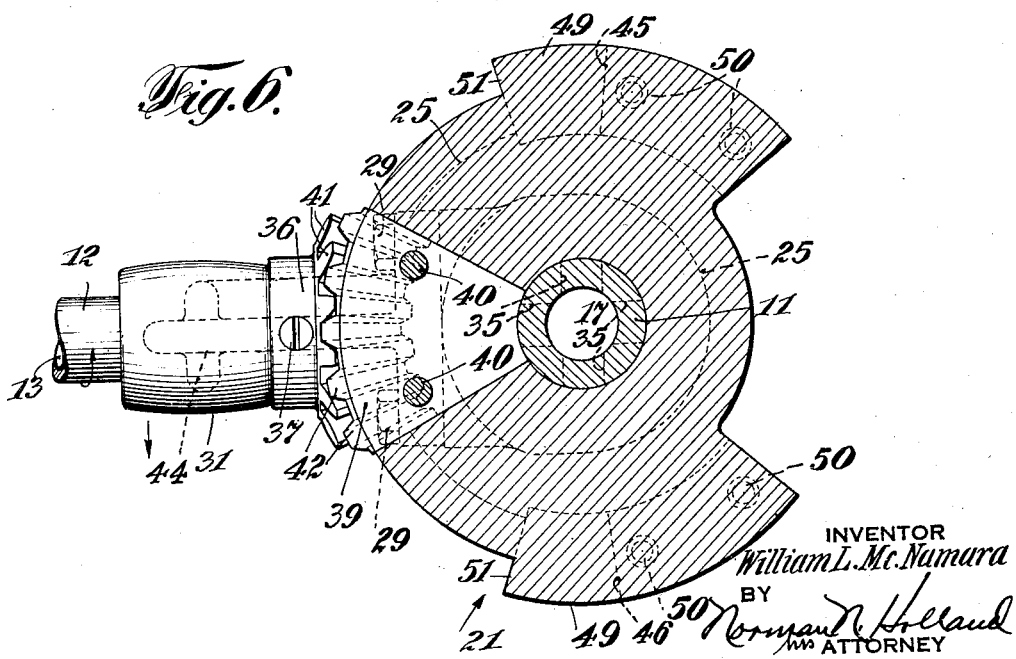
INVENTOR
William L. McNamara
BY
Norman N. Holland
ATTORNEY Feb. 20, 1934.  W. L. McNAMARA  1,947,610
TRANSFERRING DEVICE
Filed June 4, 1930  4 Sheets-Sheet 4
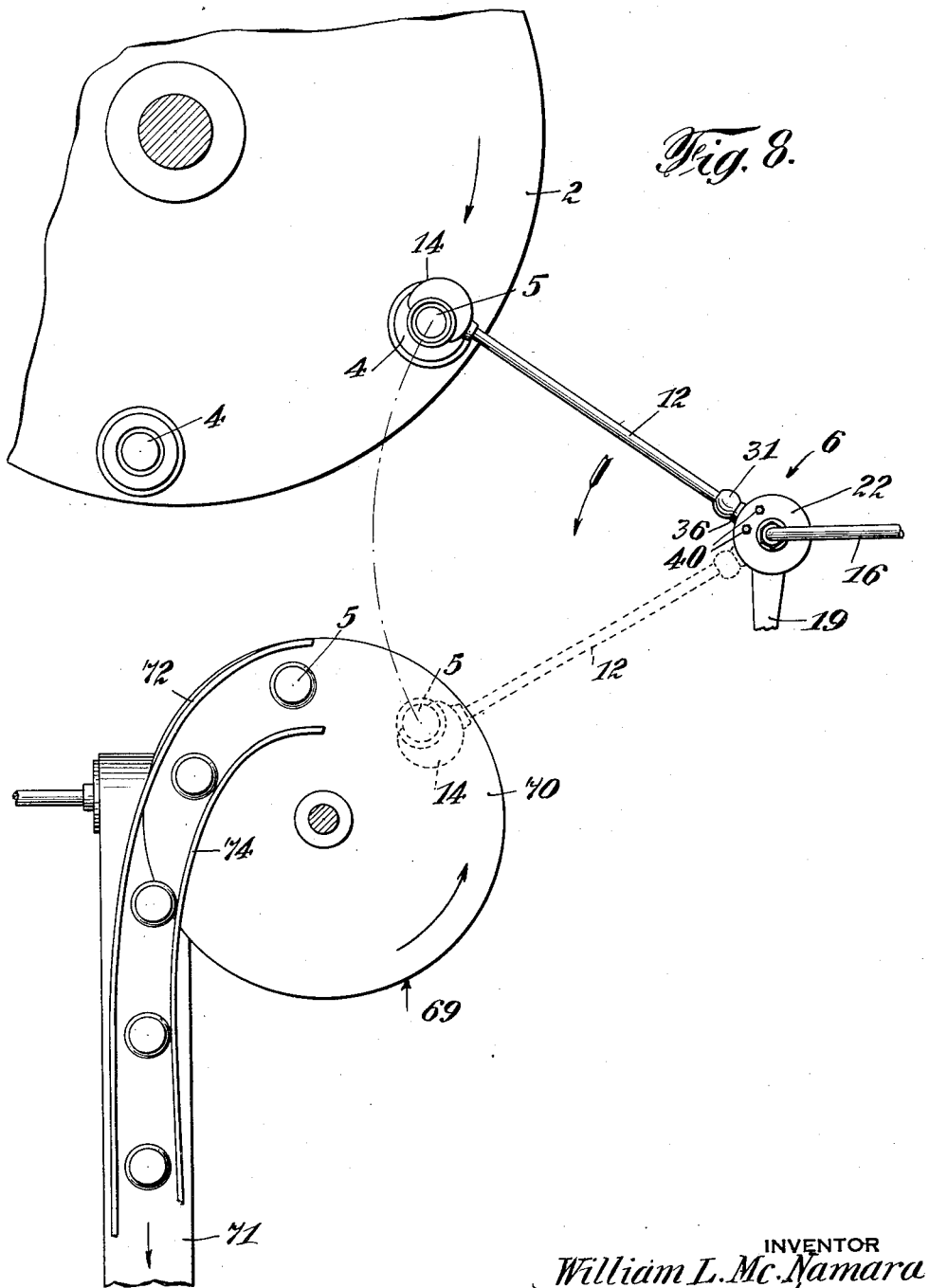
INVENTOR
William L. McNamara
BY
Norman Holland
his ATTORNEY Patented Feb. 20, 1934

1,947,610

UNITED STATES PATENT OFFICE 1,947,610

TRANSFERRING DEVICE

William L. McNamara, Connellsville, Pa., assignor to Capstan Glass Company, Connellsville, Pa., a corporation of Delaware Application June 4, 1930. Serial No. 459,182

19 Claims. (Cl. 214—1)

The present invention relates to transferring mechanisms and more particularly to an improvement in a transferring device for glass vessels and the like.

In the manufacture of glass containers such as tumblers and the like, the ware may be either pressed or blown. These operations are performed by fabricating machines which operate automatically and form the ware very rapidly. When the vessels have been molded, they are removed from the molds and are thereafter placed upon a conveyor which delivers them to a suitable annealing leer. In the past, difficulties have been encountered in transferring the containers from the mold tables of the fabricating machines onto a conveyor or to other machinery. In many instances, this was done by laborers at the take-out station of the machines, who removed the ware manually by means of tongs or other suitable implements and placed the ware upon a conveyor. This method was impractical and unsatisfactory due to the cost of the labor required and the frequent accidents occurring, whereby the ware was damaged and, in some cases, the workmen sustained injuries.

A very successful machine for handling glass vessels automatically is shown in applicant's copending application, S. N. 255,877. The machine therein ejects the containers from the molds on the mold table, engages them by means of a vacuum gripping arm, inverts the containers by rotating the arm about its longitudinal axis, and transfers them to a support from which they are pushed onto a conveyor. The present invention is an improvement upon this machine and more particularly an improvement upon the engaging, disengaging and transferring operations. The invention aims to improve the operation of take-out and transferring mechanisms, such as the one illustrated in Applicant's copending application, by providing a device which regulates the vessel engaging arm so that the gripping means is in accurate alignment with the containers while the containers are being engaged or released. This causes the vacuum to be more effective and also prevents the containers from toppling over when engaged or released. The present invention also contemplates arranging the conveyor and the associated devices in position with respect to the transferring mechanism and the mold table so that the ware is pushed onto the conveyor in the direction in which the conveyor travels, thereby minimizing any breakage caused by the relative slip between the ware and the belt.

An object of the invention is to improve devices used for transferring vessels from fabricating machines to conveyors and the like.

Another object of the invention is to provide means for properly aligning the holding means of transferring mechanisms with respect to the ware prior to the engagement and delivery thereof.

Another object of the invention is to provide means for locking a container engaging mechanism in proper position while operative upon a container.

Another object is to arrange a conveyor so that the ware may be placed thereon with a minimum tendency for disarrangement to provide better operation and to eliminate breakage of containers.

A further object of the invention is to provide improvements for a vessel handling mechanism which are readily applicable to existing machines at a small cost.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view of the improved device applied to a common form of mold table for manufacturing glass containers and the like;

Fig. 2 is a side elevational view, partly in section, taken along the line 2—2 of Fig. 1, the mold table being omitted for simplicity;

Fig. 3 is an enlarged fragmentary elevational view, taken along the line 3—3 of Fig. 1, showing the mechanism for properly positioning the vessel transferring member;

Fig. 4 is a diagrammatic view illustrating, in dotted lines, the movement of the mechanism shown in Fig. 3;

Fig. 5 is a sectional view taken along the line 5—5 of Fig. 3;

Fig. 6 is a sectional view taken along the line 6—6 of Fig. 5;

Fig. 7 is a diagrammatic view illustrating, in dotted lines, the movement of the vessel transferring member; and Fig. 8 is a top plan view similar to Fig. 1 showing a slightly different mechanism for delivering the ware to the conveyor.

Referring to the drawings, and more particularly to Fig. 1, wherein a preferred embodiment of the invention is illustrated, a portion of a fabricating machine 1 is shown for pressing or blowing glassware. A rotatable mold table 2 is shown as part of the fabricating machine having a series of molds 4 thereon wherein the ware is formed. The table 2 is preferably operated intermittently by suitable automatic devices which also control other suitable mechanisms for ejecting the ware formed within the molds when they reach the take-out station. A more detailed description of these devices, the molds and the mold table will be found in applicant's co-pending application, referred to above.

When the mold table has been rotated to a desired position, rotation ceases momentarily while a plunger, responsive to automatic control devices, elevates the ware within the molds, so that the base thereof is slightly above the upper edge of the mold. In Fig. 1, one of the molds is shown at the take-out station having a container 5 thereon which has been elevated by the plunger and is about to be engaged by suction head 14 on the transferring mechanism 6 to deliver it to an adjoining conveyor.

The transferring mechanism may comprise a column 7 mounted upon a suitable base or support 9 adjacent the mold table, and has an elongated rotatable sleeve 10 adapted to rotate about a vertical shaft 11. At the upper end of the column, there is provided a horizontal, preferably rotatable, arm 12 having a conduit 13 therein. A vessel engaging jaw 14 is attached to the free end of the arm 12, which is adapted to support the ware. The jaw 14 may be of various forms but is shown herein as a curved member having a series of apertures 15, which are connected to a vacuum line 16 through the intermediation of the conduit 13 within arm 12 and a suitable conduit 17 within the upper end of the shaft 11. Preferably, the vacuum is made effective within the arm 12 as the vessel is raised from the mold, which causes the apertures 15 within the jaw to become effective upon and to hold the vessel firmly in position. For operating the sleeve 10 to oscillate the arm 12 and transfer the vessels to a conveyor, an extending arm 19 is connected thereto and is adapted to be operated by a link 20 connected to a pneumatic cylinder or other suitable motive power. The air cylinder for operating the arm 19 and the device for opening and closing the vacuum line may be actuated by suitable means co-operating in timed relation with the vessel elevating mechanism for the molds on the mold table.

As the arm 12 oscillates through the arc shown in Fig. 1, the jaw 14 engages the vessels 5, which have been raised from the molds, and moves them toward the conveyor. During this movement, the arm 12 is preferably rotated about its longitudinal axis to invert the vessel. For this purpose, a suitable device 21 may be employed, which locks the arm 12 so that the jaw 14 is in vertical alignment prior to engaging and delivering the ware, thereby preventing the ware from toppling over. The arm is rotated during its oscillation.

Referring more particularly to Figs. 3, 4, 5 and 6, there is shown a preferred embodiment of the device 21 for rotating and locking the arm 12 in position. The device comprises a flanged sleeve member 22 secured to the upper end of the stationary shaft 11 by a set screw 24. A suitable casting 25 is collared immediately below member 22 about the rotatable sleeve 10 by means of a set screw 26. A bracket 27 is attached to the casting 25, at its lower portion, by a pair of bolts 29, and extends upwardly and outwardly from the casting to provide a support for the horizontal arm 12. At the free end of the bracket, a bearing 30 of suitable metal, such as babbitt, is retained within a journal portion 31 integral with the bracket whereby the rotation of the arm 12 is facilitated. Likewise, in the casting 25 adjacent to vertical shaft 11 and directly in line with the bearing 31, there is provided an aperture 32 adapted to retain a similar bearing 33 wherein the inwardly extending end of the arm 12 is disposed. Apertures 34 and 35 are provided within sleeve 10 and shaft 11, whereby the vacuum within the hollow portion 17 of the shaft 11 is made effective upon the conduit 13 at desired intervals.

Intermediate the bearings 30 and 33, a gear member 36, herein shown as a portion of a bevel gear, is pinioned to the arm 12 by a set screw 37 and is adapted to engage a circumferential portion of a corresponding gear rack 39 bolted to the stationary flange 22 by bolts 40. In this manner, the arm 12 is rotated to invert the ware when the sleeve 10, supporting the casting 25, is oscillated.

It will be noted that gear member 36 has teeth 41 extending only partially about its periphery. The gear rack 39 likewise has only sufficient teeth 42 to permit the gear member 36 and the arm 12 to be rotated substantially one hundred and eighty degrees. A tongue member 44 is preferably cast integral with the gear member 36 and is positioned substantially diametrically opposite the teeth 41. The tongue 44, when the gear 36 is rotated by the oscillation of the sleeve 10, is in a horizontal position and is adapted to be locked within suitable longitudinal slots 45 and 46 in the flange member 22. The slots 45 and 46 may be formed integral with the flange member 22, but, as shown in the present embodiment, they comprise a cutaway portion 47 and segments 49 of an annular rim secured to the lower portion of the member 22 by bolts 50. The segments 49 extend below the cutaway portion 47 to complete the slot construction and are substantially rounded at their free ends 51 to permit the tongue 44 to slide readily into engagement therewith.

In Fig. 4, the locking mechanism 21 is illustrated as rolled out into a single plane showing diagrammatically the position of the gear 36 and tongue 47 throughout the cycle of operation. In Fig. 7, the positions of the arm 12 and jaw 14 are shown corresponding to the movement of the gear 36, as shown in Fig. 4.

When the sleeve 10 is oscillated so that gear 36 and arm 12 are in position A, the tongue 44 is locked in the slot 45. When the sleeve is rotated in the direction as indicated by the arrow in Fig. 7, the tongue slides to the edge of the slot and the vessel engaging jaw 14 on the arm engages the ware as shown at position B, which is slightly removed from position A. Upon further rotation, the tongue gradually disengages the slot and the teeth of gear 36 mesh with the teeth of the rack 39 when position C is reached. At this point, the oscillation of the sleeve will cause the gear members to rotate the arm 12 until position D is reached, where the teeth will disengage. At position D, the tongue begins to engage the slot 46 and continues to slide therein until position E is reached, where the ware is deposited upon a suitable conveyor or the like. Upon clockwise oscillation of the sleeve 10 to its initial position, the cycle of operation is reversed until position A is reached. It will be noted that the arm 12, in moving from position C to D, is rotated about its longitudinal axis substantially one hundred and eighty degrees to invert the ware. In moving from positions A to C and from D to E, the tongue 44 is in engagement with slots 45 and 46, respectively, to lock the ware engaging jaw 14 in vertical position. This causes the jaw to engage the container throughout its width, and eliminates the tendency for the container to topple over when engaged by the jaw.

Referring more particularly to Figs. 1 and 2, one form of conveyor mechanism is shown having a vertically movable support 55, adapted to receive the vessels from the transferring mechanism mounted upon a piston rod 56 of a pneumatic cylinder 57. The cylinder is connected to a suitable control mechanism by air tubes 59 and 60, to raise and lower the support 55 in timed relation with the vessel forming machine and transferring mechanism. A suitable table 61 is provided, having a seat therein to receive the support 55, so that the upper surface thereof will be flush with the surface of the table when the support is in its lowest position.

A conveyor 62, mounted upon a pulley 64 supported by a stand 65, passes beneath the table 61 and is adapted to receive the ware. An arm 66, operated by a suitable air cylinder 67, moves the ware from table 61 onto the conveyor. The conveyor 62 is positioned to move substantially in line with the movement of the arm 66. In this manner, the arm 66 pushes the vessels onto the conveyor in the direction in which the conveyor travels. This minimizes the possibilities of toppling the ware by placing it transversely onto the moving conveyor.

Another type of conveyor mechanism 69 is illustrated in Fig. 8 wherein the arm 12 delivers the ware 5 to a circular rotating disc or table 70 substantially at the same level as the lower surface of the vessels supported by the engaging jaw 14. The vessels deposited upon the rotating table are moved onto a conveyor 71 by wires or guide members 72 and 74. This type of construction is particularly applicable to fabricating machines which press or blow small glass articles and are operated at relatively high speed; and is equally well adapted to be used with machines operated at lower speeds. It will be noted that the construction is greatly simplified by eliminating the table 61, the cylinder 57 and its associated parts, and the pusher mechanism 66. Although the vessels are shown being inverted herein, in some instances, particularly where the vessels are substantially cylindrical, it is not necessary nor desirable to invert the ware.

In operation, the mold table 2 is operated intermittently and is stopped when the consecutive molds 4 reach the take-out station. When the molds are properly positioned, the vessels 5 are ejected by a suitable plunger mechanism which raises them above the molds. At this instance, the jaw 14 attached to arm 12 is oscillated by means of the sleeve 10, arm 19 and link 20 to engage the raised vessel. At the time of engagement, the vacuum through tube 16 is made effective to pull the vessel against the surface of the jaw and hold it in position while the jaw 14 continues to move. Prior to, and during, the engagement of the vessel, the gear 36 and the plunger or tongue 44 are locked in position by the slot 45, as indicated at A and B in Fig. 4, whereby the arm 12 and jaw 14 cannot rotate. In this manner, the jaw 14 is held in perfect alignment with the vessel 5. Upon continued oscillation of the arm from B to C, the plunger 44 slides out of engagement with the slot 45 and the teeth 41 of gear 36 mesh with the corresponding teeth 42 of the gear 39 to rotate arm 12 and to invert the vessel. At position D, the plunger slides into slot 46 to lock the arm until position E is reached, at which the vessel is released by breaking the vacuum, and is delivered to the vertically movable support 55, which is then in its upper position. The support 55 is lowered by the cylinder 57 until the vessel is flush with table 61. The pusher arm 66 is then operated by the cylinder 67 to move vessels on the conveyor 62. As soon as the vessel has cleared the jaw 14 by its downward movement, the arm 12 is oscillated to its initial position, duplicating its movement in a reversed cycle of operation. The table 2 is then rotated until the next mold reaches the take-out station.

When the modified conveyor mechanism 69, shown in Fig. 8, is employed, the transferring mechanism 6 is operated in the like manner. However, when the arm 12 reaches position E, the vessels are placed directly upon the rotating table 70 which moves them to the conveyor 71 by means of the guide members 72 and 74.

It will be seen that the present invention contemplates improvements which are simple in construction and operation and can readily be applied to existing fabricating machines, take-out devices and transferring mechanisms. The jaws adapted to support the vessels are locked in proper position while the vessels are being engaged and delivered, and any possible vibration and rotation, which cause the jaw not to be in alignment with the vessel, are eliminated entirely. Breakage of the ware due to the jaw being out of position is minimized, and higher operating speeds of the mold table have been made possible. The construction of the conveyor mechanism has been simplified by the elimination of elements and by the arrangement of the parts thereof to enable a greater output. The improvements are rugged in construction and are not likely to be impaired by the rough usage to which they may be subjected.

As various changes may be made in the form, construction and arrangement of the parts herein without departing from the spirit and scope of the invention and without sacrificing its advantages, it is to be understood that all matter herein is to be interpreted as illustrative and not in a limiting sense.

Having thus described my invention, I claim:

1. In a device of the class described, the combination of vacuum holding means for engaging and supporting a container, devices for moving said means to transfer the container, from one position to another, and an extending member on said devices adapted to engage a suitable groove for locking said vacuum means to prevent rotation thereof prior to the engagement of a container by said means.

2. In a device of the class described, the combination of vacuum holding means for engaging and supporting a container and devices for moving said means to transfer the container from one position to another, mechanism for inverting said container supporting means, and means for locking said mechanism in vertical position prior to and after the inversion thereof.

3. In a device of the class described, the combination of an arm, vacuum means at one end of said arm adapted to engage and support a container at the exterior surface thereof, mechanism for rotating said arm about its longitudinal axis, and means for locking said arm in position to prevent the arm from vibrating prior to and after the rotation thereof.

4. In a device of the class described, the combination of an arm adapted for engaging and transferring containers, mechanism for rotating said arm about its longitudinal axis, and interlocking means for holding said arm in position to prevent rotation prior to the engagement of a container.

5. In a device of the class described, the combination of an arm rotatable about its longitudinal axis adapted for engaging and transferring containers, mechanism for oscillating said arm through its horizontal plane, and means for locking said arm to prevent it from rotating about its longitudinal axis prior to and after the oscillation thereof.

6. In a device of the class described, the combination of an arm adapted for engaging and transferring containers, mechanism for oscillating said arm in a horizontal plane and rotating said arm about its longitudinal axis, and interlocking means for holding said arm in position to prevent rotation and to eliminate vibrations when the arm has been oscillated to a predetermined position.

7. In a device for transferring containers from molds to a conveyor, the combination of a member adapted to engage a container, devices for oscillating said member, means for inverting said member whereby the container is placed upon a receiving station adjacent to a conveyor, and mechanism adapted to restrain said member from vibrating while delivering the container.

8. In a device of the class described, the combination of a transferring member having means for engaging a vessel, means for moving said member to deliver vessels to a support, and devices for rotating said member about its longitudinal axis during said transferring movement to deliver the vessels in inverted position, said devices comprising a plurality of gear members, an extending portion on one of said gear members, and slots adapted to receive said portion when the rotating member is moved to a predetermined position, whereby said rotating member is locked so that the containers are in a vertical position and possible vibration or rotation of the arm is eliminated.

9. In a device of the class described, the combination of a transferring member adapted to engage and move containers from a mold table, means for inverting the containers, mechanism for positively locking said member in alignment with the containers prior to the engagement or release thereof, whereby the containers are delivered from said member in upright position, and a device for receiving the containers and delivering them to a conveyor.

10. In a device of the class described, the combination of a horizontal arm, a suction head connected to said arm adapted to engage the exterior surface of a container, means for rotating said arm about its longitudinal axis, means for rotating said arm in a horizontal plane, and an extending member associated with said arm and first mentioned rotating means, adapted to engage suitable slots prior to the engagement and release of the container, and to lock the suction head in substantially vertical position.

11. In a device for transferring glass, the combination of a rotatable shaft, means for supporting said shaft, a horizontal arm mounted on said shaft adapted to be rotated about its longitudinal axis, when said shaft is rotated, members for rotating said arm and means on one of said members adapted to prevent the longitudinal rotation of said arm at desired intervals during the rotation of said shaft.

12. In a transferring mechanism, the combination of a vertical column, a rotatable shaft supported by said column, a horizontally extending arm mounted on said shaft adapted to be rotated about its longitudinal axis, and means on said rotatable shaft adapted to engage suitable means on said column when said rotatable shaft reaches a predetermined position whereby said extending arm cannot be rotated about its longitudinal axis when in said position.

13. In a device of the class described, the combination of horizontally extending transferring means adapted to engage a vessel, a plurality of gear members for rotating said means about its horizontal axis, and an extending portion on one of said gear members adapted to engage suitable slots whereby said means are locked in position to prevent longitudinal rotation thereof prior to the engagement and delivery of a container.

14. In a device of the class described, the combination of a transferring arm, a member on said arm adapted to engage a container, devices for oscillating said arm in a horizontal plane, a plurality of gear members for rotating said arm about its longitudinal axis during oscillation thereof, and interlocking devices effective at desired intervals during the oscillation of said arm to prevent rotation of said arm during said intervals.

15. In a vessel transferring device, the combination of an arm, means on said arm for engaging and supporting a container, devices for oscillating said arm in its horizontal plane, devices for rotating said arm about its longitudinal axis, and mechanism for locking said rotating devices prior to the operation of the oscillating devices.

16. In a transferring device, the combination of an extending member adapted to transfer containers from one position to another, means for inverting said member by rotating it about its longitudinal axis, a rotatable table for receiving containers from said member, mechanism for locking said inverting means to prevent further rotation and vibration after said member has been inverted whereby the containers are delivered in alignment with said table, and means adapted to position the containers upon a conveyor.

17. In a transferring mechanism, the combination of a member having vacuum operated means thereon adapted to fit and engage containers to transfer the containers one at a time from one position to another, a suction conduit leading to said vacuum operated means, means adapted to receive the transferred containers one at a time, the vacuum in said conduit being relieved when a container is deposited on said receiving means, mechanism for lowering said receiving means, a continuously moving conveyor in horizontal alignment with said means when in lowered position, said conveyor being adapted to move away from said receiving means, and a member adapted to move the containers from said receiving means onto the moving conveyor, said last member moving in the same direction as the conveyor moves to minimize slippage between the tumbler and conveyor and to prevent the containers from being upset while being pushed onto the moving conveyor.

18. In a transferring mechanism, the combination of a vessel engaging arm having a suction head thereon adapted to transfer containers one at a time from one position to another, a vacuum conduit leading to said suction head, a platform adapted to receive the containers delivered by said arm, the vacuum in said conduit being relieved when a container is placed on said platform, mechanism for lowering said platform when a container is placed thereon, a continuously moving conveyor in substantially horizontal alignment with said platform when in its lower position, and a second transferring arm adapted to move the containers from said platform onto said moving conveyor, said second arm moving the containers in the same direction as the conveyor moves to minimize slippage between the container and the moving conveyor as the vessels slide thereon.

19. In a transferring device, the combination of an extending member adapted to transfer containers from one position to another, means for inverting said member by rotating it about its longitudinal axis, a rotatable table for receiving containers from said member, means for rotating said table, said table being adapted to move said containers out of the path of said member, mechanism for rotating said table, mechanism for locking said inverting means to prevent further rotation and vibration after said member has been inverted, and means adapted to guide the containers from said rotating table onto a conveyor.

WILLIAM L. McNAMARA.